(12) United States Patent
Choate

(10) Patent No.: US 8,206,827 B2
(45) Date of Patent: Jun. 26, 2012

(54) DENDRITIC POLYURETHANE COATING

(75) Inventor: Thomas F. Choate, Pinckney, MI (US)

(73) Assignee: Nanovere Technologies, LLC, Brighton, MI (US)

( * ) Notice: Subject to any disclaimer, the term of this patent is extended or adjusted under 35 U.S.C. 154(b) by 1066 days.

(21) Appl. No.: 12/049,075

(22) Filed: Mar. 14, 2008

(65) Prior Publication Data

US 2008/0226829 A1 Sep. 18, 2008

Related U.S. Application Data

(60) Provisional application No. 60/918,517, filed on Mar. 15, 2007.

(51) Int. Cl.
- B32B 27/40 (2006.01)
- B32B 27/20 (2006.01)
- B32B 27/26 (2006.01)
- B05D 3/02 (2006.01)
- C08G 71/04 (2006.01)
- C08L 67/00 (2006.01)
- C08L 75/06 (2006.01)

(52) U.S. Cl. .............. 428/423.1; 427/385.5; 428/323; 428/327; 525/450; 525/453

(58) Field of Classification Search .................. None
See application file for complete search history.

(56) References Cited

U.S. PATENT DOCUMENTS

| | | | |
|---|---|---|---|
| 3,549,583 A | 12/1970 | Nagata et al. | |
| 3,632,789 A | 1/1972 | Wilhelm et al. | |
| 4,184,989 A | 1/1980 | Flakus et al. | |
| 4,268,426 A | 5/1981 | Williams et al. | |
| 4,374,164 A | 2/1983 | Blank et al. | |
| 4,491,646 A | 1/1985 | Gruber et al. | |
| 4,792,580 A | 12/1988 | Doshi | |
| 4,945,128 A | 7/1990 | Hille et al. | |
| 5,075,370 A | 12/1991 | Kubitza et al. | |
| 5,194,487 A | 3/1993 | Jacobs | |
| 5,276,097 A | 1/1994 | Hoffman et al. | |
| 5,306,758 A | 4/1994 | Pallerite et al. | |
| 5,314,953 A | 5/1994 | Corcoran et al. | |
| 5,326,820 A | 7/1994 | Hoffman et al. | |
| 5,332,785 A | 7/1994 | Brindoepke | |
| 5,344,873 A | 9/1994 | Blum | |
| 5,373,050 A | 12/1994 | Morikawa et al. | |
| 5,380,792 A | 1/1995 | Renk | |
| 5,389,718 A | 2/1995 | Potter et al. | |
| 5,391,620 A | 2/1995 | Bederke et al. | |
| 5,418,301 A | 5/1995 | Hult et al. | |
| 5,459,197 A | 10/1995 | Schwindt et al. | |
| 5,633,307 A | 5/1997 | Das et al. | |
| 5,670,600 A | 9/1997 | Niehauss et al. | |
| 5,688,859 A | 11/1997 | Schneider et al. | |
| 5,731,095 A | 3/1998 | Milco et al. | |
| 5,744,542 A | 4/1998 | Martz et al. | |
| 5,747,166 A | 5/1998 | Schwarte et al. | |
| 5,763,528 A | 6/1998 | Barsotti et al. | |
| 5,834,555 A | 11/1998 | Meisenburg et al. | |
| 5,876,802 A | 3/1999 | Brunnenmann et al. | |
| 5,965,272 A | 10/1999 | Donnelly et al. | |
| 5,985,985 A | 11/1999 | Weingart et al. | |
| 6,130,286 A | 10/2000 | Thomas et al. | |
| 6,180,180 B1 | 1/2001 | Hintze-Bruning et al. | |
| 6,191,225 B1 | 2/2001 | Barkac et al. | |
| 6,221,494 B1 | 4/2001 | Barsotti et al. | |
| 6,326,059 B1 | 12/2001 | Lewin et al. | |
| 6,428,898 B1 | 8/2002 | Barsotti et al. | |
| 6,429,256 B1 | 8/2002 | Vandevoorde et al. | |
| 6,432,484 B1 | 8/2002 | Corcoran et al. | |
| 6,444,320 B1 | 9/2002 | Takei et al. | |
| 6,462,144 B1 | 10/2002 | Ramesh et al. | |
| 6,471,185 B2 | 10/2002 | Lewin et al. | |
| 6,500,544 B1 | 12/2002 | Tiitu et al. | |
| 6,544,593 B1 | 4/2003 | Nagata et al. | |
| 6,586,521 B2 | 7/2003 | Blum et al. | |
| 6,592,944 B1 | 7/2003 | Uhlianuk et al. | |
| 6,607,833 B1 | 8/2003 | Uhlianuk et al. | |
| 6,632,880 B2 | 10/2003 | Barsotti et al. | |
| 6,635,314 B1 | 10/2003 | William et al. | |
| 6,652,915 B1 | 11/2003 | Baumgart et al. | |
| 6,664,306 B2 | 12/2003 | Gaddam et al. | |
| 6,797,771 B2 | 9/2004 | Sapper et al. | |
| 6,803,408 B2 | 10/2004 | Anderson et al. | |
| 6,818,699 B2 | 11/2004 | Kajimaru et al. | |
| 6,855,779 B1 | 2/2005 | Nagata et al. | |
| 6,875,514 B2 | 4/2005 | Sormani et al. | |
| 6,894,123 B2 | 5/2005 | Pelosi et al. | |
| 6,897,259 B1 | 5/2005 | Cramer et al. | |
| 6,927,271 B2 | 8/2005 | Grandhee et al. | |
| 6,984,693 B2 | 1/2006 | Lewin et al. | |
| 6,989,421 B2 | 1/2006 | Grady | |
| 6,998,154 B2 | 2/2006 | Barsotti et al. | |
| 7,001,958 B2 | 2/2006 | Pelosi et al. | |
| 7,067,584 B2 | 6/2006 | Rink et al. | |
| 7,071,264 B2 | 7/2006 | Darling et al. | |

(Continued)

OTHER PUBLICATIONS

Product data sheet for Nanobyk-3610, provided by Byk (2011).*

(Continued)

*Primary Examiner* — Michael J Feely

(74) *Attorney, Agent, or Firm* — Stephen A. Bent; Foley & Lardner LLP

(57) ABSTRACT

The invention herein relates to a surface protective dendritic polymer composition and to the cross-linked surface protective coating formed therefrom.

32 Claims, 1 Drawing Sheet

U.S. PATENT DOCUMENTS

| | | |
|---|---|---|
| 7,148,310 B2 | 12/2006 | Barsotti et al. |
| 7,169,475 B2 | 1/2007 | Sormani et al. |
| 7,199,194 B2 | 4/2007 | Barsotti et al. |
| 7,217,442 B2 | 5/2007 | Wilt et al. |
| 7,220,338 B2 | 5/2007 | Chen et al. |
| 7,232,860 B2 | 6/2007 | Melchiors et al. |
| 7,268,182 B2 | 9/2007 | Sunkara et al. |
| 7,368,499 B2 | 5/2008 | Fenn et al. |
| 7,396,861 B2 | 7/2008 | Loccufier et al. |
| 7,414,091 B2 | 8/2008 | Chen et al. |
| 7,427,647 B2 | 9/2008 | Reinartz et al. |
| 7,446,155 B2 | 11/2008 | Dvornic et al. |
| 7,501,472 B2 | 3/2009 | Steidl et al. |
| 7,531,614 B2 | 5/2009 | Hille et al. |
| 7,550,527 B2 | 6/2009 | Hofacker et al. |
| 7,682,665 B2 | 3/2010 | Lenges et al. |
| 7,714,069 B2 | 5/2010 | Corcoran et al. |
| 7,732,018 B2 | 6/2010 | Lenges et al. |
| 7,737,243 B2 | 6/2010 | Adams et al. |
| 7,745,540 B2 | 6/2010 | Devadoss et al. |
| 7,754,818 B2 | 7/2010 | Devadoss et al. |
| 7,763,679 B2 | 7/2010 | Corcoran et al. |
| 7,816,451 B2 | 10/2010 | Reichst, Jr. et al. |
| 7,858,692 B2 | 12/2010 | Paquet, Jr. et al. |
| 7,888,431 B2 | 2/2011 | Huynh-Ba et al. |
| 7,906,214 B2 | 3/2011 | Seybert et al. |
| 7,910,644 B2 | 3/2011 | Saliya et al. |
| 7,919,423 B2 | 4/2011 | Feldman et al. |
| 2002/0151652 A1 | 10/2002 | Adedeji |
| 2003/0096908 A1 | 5/2003 | Heilmann et al. |
| 2003/0191231 A1 | 10/2003 | Martin et al. |
| 2003/0191236 A1 | 10/2003 | Buckamnn et al. |
| 2004/0010091 A1 | 1/2004 | Paquet, Jr. et al. |
| 2004/0030031 A1 | 2/2004 | Martin et al. |
| 2004/0039098 A1 | 2/2004 | Belmares et al. |
| 2004/0043152 A1 | 3/2004 | Barsotti et al. |
| 2004/0059082 A1 | 3/2004 | Laas et al. |
| 2004/0063851 A1 | 4/2004 | Neppl et al. |
| 2004/0092006 A1 | 5/2004 | Lindekens et al. |
| 2004/0106769 A1 | 6/2004 | Hatton et al. |
| 2004/0122172 A1 | 6/2004 | Glockner et al. |
| 2004/0143033 A1* | 7/2004 | Schwarte et al. ............. 523/171 |
| 2004/0185263 A1 | 9/2004 | Sormani et al. |
| 2004/0204524 A1 | 10/2004 | Baumgart et al. |
| 2004/0214912 A1 | 10/2004 | Rink et al. |
| 2004/0248039 A1 | 12/2004 | Sounik et al. |
| 2004/0258923 A1 | 12/2004 | Sormani et al. |
| 2005/0054786 A1 | 3/2005 | Barsotti et al. |
| 2006/0058414 A1 | 3/2006 | Arthur et al. |
| 2006/0058415 A1 | 3/2006 | Arthur et al. |
| 2006/0058416 A1 | 3/2006 | Brandenburg et al. |
| 2006/0058418 A1 | 3/2006 | Brandenburg et al. |
| 2006/0111477 A1 | 5/2006 | Mrvos et al. |
| 2006/0155017 A1* | 7/2006 | Devadoss et al. ............. 524/113 |
| 2006/0155021 A1 | 7/2006 | Lenges et al. |
| 2006/0216500 A1 | 9/2006 | Klun et al. |
| 2006/0222875 A1 | 10/2006 | Sormani et al. |
| 2006/0240232 A1 | 10/2006 | Faris |
| 2006/0252892 A1 | 11/2006 | Basheer et al. |
| 2007/0040297 A1 | 2/2007 | Melanson |
| 2008/0090944 A1 | 4/2008 | Nunez et al. |
| 2008/0132631 A1 | 6/2008 | Natarajan et al. |
| 2008/0161506 A1 | 7/2008 | Martz et al. |
| 2008/0188577 A1 | 8/2008 | Schmidt et al. |
| 2008/0213544 A1 | 9/2008 | Devadoss et al. |
| 2009/0081373 A1* | 3/2009 | Choate ........................ 427/385.5 |

OTHER PUBLICATIONS

Product data sheet for Nanobyk-3820/3840/3860, provided by Byk (2008).*

Product data sheet for Boltorn H40, provided by Perstorp (2011).*

Advanced Polymeric Materials: Chapter 8: "Properties of Dendrimers and Hyperbranched Polymers and Their Blends" by Wang et al. (2003).*

Non-Final Office Action U.S. Appl. No. 12/170,250 dated Jun. 9, 2011.

International Search Report for application PCT/US0857242, mailed Jul. 25, 2008, 12 pgs.

Molinaro, "Nanotech-based additives (materials)", Abstract, http://goliath.exnext.com/coms2/gi, downloaded Jul. 19, 2008.

* cited by examiner

DENDRITIC POLYURETHANE COATING

RELATED APPLICATIONS

This application claims the benefit of U.S. Provisional Patent Application Ser. No. 60/918,517, filed 15 Mar. 2007, which is incorporated fully, including any drawings, as if set forth in its entirety herein.

FIELD

This invention relates to polymeric protective coatings for surfaces. In particular, it relates to a clear polymeric protective coating for painted surfaces such as those found in, without limitation, the automotive, marine and aviation industries.

BACKGROUND

Surfaces, in particular painted surfaces exposed to the environment, may be damaged by elements such as water, snow, ice, heat, dirt, smog, humidity, bird droppings, grime, salts, chemical attack, and acid precipitation. This is particularly so With regard to painted surfaces such as those on motor vehicles, boats and airplanes. Painted surfaces may also be subject to loss of gloss from micro-scratching due to surface cleaning and from ultraviolet degradation due to long-term exposure to sunlight.

The above problems are, of course, well-known to those in industries whose products are regularly exposed to the environment. The automotive industry, for example, commonly applies protective clear coats over painted surfaces to mitigate the effects of environmental exposure on auto paint. Most clear coats used in the automotive industry are either acrylics, including thermosetting acrylic (TSA) based on polyacrylic/melamine resins, gel-coat epoxies or, increasingly, one- and two-component polyurethane liquid and powder coatings. These and other conventional coatings, however, are still quite susceptible to being scratched, chipped or otherwise damaged as the result of cleaning and maintenance, weathering, environmental conditions, manufacturing and distribution processes and, for that matter, normal use.

What is needed is an improved protective coating that protects surfaces, in particular painted surfaces, more thoroughly than currently existing technologies. The current application provides such coatings.

SUMMARY

Thus, an aspect of this invention is a coating composition, comprising:
a first component comprising:
  a hydroxyl functional dendritic polymer;
  optionally, an acrylic polyol;
  a plurality of metal oxide nanoparticles optionally encapsulated in a hydroxyl functional polymer and/or a hydroxyl functional fluorosurfactant;
  optionally, a sterically hindered amine light stabilizer;
  optionally, a UV absorber;
  a catalyst; and
  a first solvent in which the above materials are dissolved or, in the case of the nanoparticles, dispersed; and,
a second component comprising
  a cross-linking agent, and
  a second solvent which may be the same as or different from the first solvent, wherein:
    the first and second components are mixed together to form the coating composition.

In an aspect of this invention, the hydroxyl functional dendritic polymer has a hydroxyl functionality of 40 to 80.

In an aspect of this invention, the hydroxyl functional dendritic polymer is BOLTORN H-40®.

In an aspect of this invention, the acrylic polyol has a hydroxyl functionality of 2 to 6.

In an aspect of this invention, the acrylic polyol is G-CURE 108BL70®.

In an aspect of this invention, the hydroxyl functional fluorosurfactant is ZONYL 8857A®.

In an aspect of this invention, the plurality of metal oxide nanoparticles is selected from the group consisting of aluminum oxide nanoparticles, zinc oxide nanoparticles and combinations thereof.

In an aspect of this invention, the aluminum oxide nanoparticles are NANOBYK 3610® aluminum oxide nanoparticles.

In an aspect of this invention, the zinc oxide nanoparticles are NANOBYK 3840® zinc oxide nanoparticles.

In an aspect of this invention, the plurality of metal oxide nanoparticles comprises a mixture of a plurality of NANOBYK 3610® aluminum oxide nanoparticles and a plurality of NANOBYK 3840® zinc oxide nanoparticles.

In an aspect of this invention, the hydroxyl functional polymer is a hydroxyl functional silicone acrylate.

In an aspect of this invention, the hydroxyl functional silicone acrylate is BYK CLEANSIL 3700®.

In an aspect of this invention, the sterically hindered amine light stabilizer is TINUVIN 292®.

In an aspect of this invention, the UV absorber is TINUVIN 1130®.

In an aspect of this invention, the first solvent is anhydrous acetone and propylene glycol methyl ether acetate.

In an aspect of this invention the cross-linking agent is a polyisocyanate.

In an aspect of this invention, the polyisocyanate is DESMODUR N-3300®.

In an aspect of this invention, the catalyst is dibutyltin diacetate.

In an aspect of this invention, the cross-linking agent is a melamine formaldehyde resin.

In an aspect of this invention, the melamine formaldehyde resin is hexa(methoxymethyl)melamine.

In an aspect of this invention, the hexa(methoxymethyl) melamine formaldehyde resin is selected from the group consisting of CYMEL 303® and RESIMENE 747®.

In an aspect of this invention, the second solvent is a mixture of acetone and propylene glycol methyl ether acetate or a mixture of methyl ethyl ketone and propylene glycol methyl ether acetate.

An aspect of this invention is a coating composition, comprising:
a first component comprising:
  BOLTORN H40® hydroxyl functional dendritic polyester;
  G-cure 108BL70® acrylic polyol;
  a plurality of NANOBYK 3610® aluminum oxide nanoparticles encapsulated in BYK SILCLEAN 3700®;
  a plurality of NANOBYK 3840® zinc oxide nanoparticles encapsulated in BYK SILCLEAN 3700®; TINUVIN 292® sterically hindered amine light stabilizer;
  TINUVIN 1130® UV absorber;
  dibutyltin diacetate catalyst; and
  a mixture of anhydrous acetone and propylene glycol methyl ether acetate; and,
a second component comprising
  DESMODUR N-3300® polyisocyanate; and, a mixture of acetone or methyl ethyl ketone and propylene glycol methyl ether acetate, wherein
the first and second components are mixed together to form the coating composition.

In an aspect of this invention, the coating composition just above further comprises ZONYL 8857A® hydroxyl functional fluorosurfactant.

An aspect of this invention is a coating composition, comprising:
a first component comprising:
BOLTORN H40® hydroxyl functional dendritic polyester;
G-CURE 108BL70® acrylic polyol;
a plurality of NANOBYK 3610® aluminum oxide nanoparticles encapsulated in BYK SILCLEAN 3700® hydroxyl functional silicone polyacrylate;
a plurality of NANOBYK 3840® zinc oxide nanoparticles encapsulated in BYK SILCLEAN 3700® hydroxyl functional silicone polyacrylate;
TINUVIN 292® sterically hindered amine light stabilizer;
TINUVIN 1130® UV absorber;
an acid catalyst; and
a mixture of anhydrous acetone and propylene glycol methyl ether acetate; and,
a second component comprising:
CYMEL 303® or RESIMENE 747® melamine formaldehyde resin; and,
a mixture of acetone or methyl ethyl ketone and propylene glycol methyl ether acetate, wherein
the first and second components are mixed together to form the coating composition.

In an aspect of this invention, in the coating composition just above, the acid catalyst is a sulfonic acid.

In an aspect of this invention, the sulfonic acid is selected from the group consisting of p-toluene sulfonic acid and dodecylbenzyl sulfonic acid.

In an aspect of this invention, the coating composition just above further comprising ZONYL 8857A® hydroxyl functional fluorosurfactant.

An aspect of this invention is a surface protective coating, comprising any of the above coating compositions after it has been deposited on a substrate surface, cured and dried.

An aspect of this invention is a method of forming a surface protective coating on a substrate surface, comprising:
providing any of the above coating compositions;
depositing the coating composition on the substrate surface no more than about one hour after mixing the first and second components; and,
curing the deposited coating composition.

In an aspect of this invention, in the above method, curing comprising heating the deposited coating composition.

An aspect of this invention is a coating composition, comprising:
a first component comprising:
BOLTORN H40® hydroxyl functional dendritic polyester;
G-cure 108BL70® acrylic polyol;
a plurality of NANOBYK 3610® aluminum oxide nanoparticles encapsulated in ZONYL 8857A®;
a plurality of NANOBYK 3840® zinc oxide nanoparticles encapsulated in ZONYL 8857A®;
TINUVIN 292® sterically hindered amine light stabilizer;
TINUVIN 1130® UV absorber;
dibutyltin diacetate catalyst; and
a mixture of anhydrous acetone and propylene glycol methyl ether acetate; and,
a second component comprising
DESMODUR N-3300® polyisocyanate; and,
a mixture of acetone or methyl ethyl ketone and propylene glycol methyl ether acetate, wherein
the first and second components are mixed together to form the coating composition.

DETAILED DESCRIPTION OF THE INVENTION

BRIEF DESCRIPTION OF THE TABLES

Figures 1A, 1B:
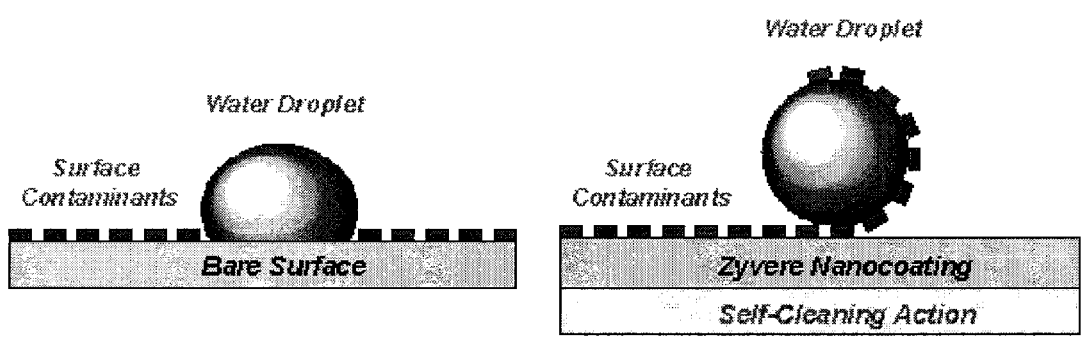
FIGS. 1A and 1B illustrate the self-cleaning action of the coating composition of the present invention.

Table 1 is a summary of laboratory tests results comparing ZYVERE®, an exemplary surface protective coating of this invention with currently available commercial coatings.

Discussion

The present invention relates to a surface protective coating comprising a cross-linked dendritic polymer and to methods of creating same. In a presently preferred embodiment the dendritic polymer is hydroxyl functional. The hydroxyl functional dendritic polymer may have any degree of hydroxyl functionality but it is presently preferred that it be from about 40 to about 80.

As used herein, "hydroxyl functional" and "hydroxyl functionality" refer to the type and number of the indicated functional group available on a multifunctional molecule for reaction with reagents that typically react with such groups. For instance, with regard to dendritic polymers, it refers to the number of functional groups available on the $n^{th}$ generation of the polymer. Thus, for example without limitation, a dendritic polymer that has a hydroxyl functionality of 60 would be understood to have 60 hydroxyl groups available on the outer "surface" of the polymer for reaction with reagents that will react with hydroxyl groups.

In some embodiments, the coating also includes dispersed nanoparticles to further improve the beneficial characteristics of the coatings. The nanoparticles may be coated with or encapsulated within (the terms are used interchangeably herein) a functionalized polymer where the functional group (s) is capable of reacting with the same reagents that react with the functional groups of the dendrimer. In this manner the nanoparticles will participate in cross-linking and will become an integral part of the resin coating. Thus, if the presently preferred hydroxyl functional dendritic polymer is selected for use in the preparation of a coating of this invention, the polymer used to encapsulate the nanoparticles is preferably also hydroxyl functional. A presently preferred hydroxyl functional polymer for encapsulating the nanoparticles is a hydroxyl functional silicone acrylic polyol.

The coating is formed by combining two components, one of which comprises hydroxyl functional resin precursors and optional additional components and the other of which comprises a cross-linker capable of reacting with hydroxyl groups. The two components, when combined, may be cured under ambient conditions or, alternatively, under heat cure conditions using conventional processing described herein.

A presently preferred cross-linking agent is polyisocyanate, which can react with hydroxyl groups to form urethanes. Another cross-linker that may be used is a melamine formaldehyde resin, which can react with hydroxyl groups to form acetals.

Various embodiments of the present invention are suitable for use in applications including, but not limited to, automotive Original Equipment Manufacturing (OEM) finishes, automotive aftermarket refinish, automotive aftermarket custom paint, fleet market, industrial machinery and equipment, marine refinish, military, aviation and consumer product applications. The coating provides an extremely hard protective surface possessing long-term gloss retention, very high water repellency, excellent scratch resistance and dirt release properties. The coating surface can have self-cleaning properties such that when water droplets roll across a fully cured coating surface, the droplets pick up dirt and contaminants leaving behind a cleaner surface.

Coatings of the present invention exhibit a number of advantages over current multipurpose protective coatings such as those used in the automotive industry. For example, the precursor coating composition, i.e., the composition that arises when the two components are mixed but have not yet been cured, has a relatively high solids content (e.g., 50-65%) and a low viscosity, which facilitates application of the composition on a substrate. Further, the cured coating possesses unique physical properties including, without limitation, long-term weather resistance, self-cleaning dirt release properties, ultra-high scratch resistance (as high as a 6H pencil hardness based on ASTM D3363), high chemical resistance (over 1500 methyl ethyl ketone (MEK) rubs without surface damage (ASTM D4752)), hydrophobicity (approach or exceed water contact angles of 90 to 100 degrees), high gloss (92.2 based on ASTM D523), excellent gloss retention, and long-term UV protection. For example, embodiments of the present invention have been shown to have higher scratch resistance than Ceramiclear® (PPG, Pittsburgh, Pa.).

As used herein, "precursor composition" refers to the composition that is obtained after the two components described above have been mixed together and are ready for deposition on a substrate surface but are not yet cured.

The precursor composition may be applied to the base coat of a substrate using conventional automotive paint processes including brushing, dipping, and spraying. High Volume Low Pressure (HVLP), Low Volume Low Pressure (LVLP), compressed air spraying, and electrostatic spraying equipment which are conventionally used by Original Equipment Manufacturers (OEM) can be used. After application, the precursor composition may be cured by ambient air or heat curing.

The wet film build of a coating herein can range from about 1 to about 2 mils (25 to 50 microns) and the dry film build can range from about 2 to about 4 mils (50 to 100 microns) in thickness. The resulting coating produces a high-gloss surface with unique leveling, flow and sag resistance, compared to conventional coatings.

"Wet film build" refers to the precursor composition as it exists after being sprayed onto a surface but is still in liquid form. When the composition cures and becomes hard, it is referred to as "dry film build." "Leveling" is when the coating levels or becomes more flat or a glass-like surface. "Flow" is when the coating is sprayed and flows across the surface easily. "Sag resistance" is when the coating is sprayed in a vertical fashion without sagging or running. Coatings resulting from the composition herein exhibit excellent sag resistance because of the nanoparticles, which help keep the coating from sagging or running down a vertical surface when applied.

Coatings of this invention have SELF-CLEANING ACTION®, which refers to the ability of the coating to facilitate removal and reduce accumulation of dirt particles and to repel moisture from a surface that has been coated. The self-cleaning action produces a clear coating surface that is easier to clean and maintain than surfaces with conventional clear coatings.

Without being held to any particular theory, it is believed that the self-cleaning action of the coating composition might be attributable to photo-catalytic properties of zinc oxide nanoparticles at the surface of a coating of this invention. At the same time, the absorption of UV light by the zinc oxide also protects the surface from UV-induced substrate deterioration. The coatings hereof can also impart dirt release properties to a substrate surface, which reduce or prevent dirt, grime, and other contaminants from attaching to a fully cured coated surface. Additionally, undesirable accumulation or residue, such as dirt, grime, paint, or ink can be removed relatively easily by wiping. Again, without being held to any particular theory, the dirt release properties may be due at least in part to the dendritic backbone resin structure in the coating composition and the aluminum oxide and zinc oxide nanoparticles encapsulated within a polymer such as silicone polyacrylate.

Additionally, the coating composition can also restore color on paint surfaces by reversing chalking. "Chalking" occurs when a coating breaks down on the surface due to weathering or ultraviolet degradation from the sun over time. The nanoparticles and nano structured resin particles are capable of penetrating small recesses in a substrate, including degraded paint, which has become chalky over time as a result of ultraviolet degradation. The coating composition is clear and is resistant to yellowing.

The self-cleaning properties of the coating may also arise as least in part from the hydrophobic properties of the coating composition of this invention. The hydrophobic coating repels moisture from a coated substrate. Water droplets tend to bead and roll off a fully cured composition of this invention. It is believed that the droplets pick up dirt and other surface contaminant as they move along the surface adding further to the self-cleaning properties of a coating herein. A schematic illustration of this phenomenon is shown in FIGS. 1A and 1B. FIG. 1A depicts a water droplet on a bare surface with surface contaminants. FIG. 1B depicts a water droplet on a surface coated with Zyvere® nanocoating, a commercial embodiment of the present invention. In FIG. 1B, as the droplet rolls off the coated surface, it carries with it surface contaminants from the coated surface.

The hydrophobic properties of coatings of this invention also facilitate cleaning and maintaining surfaces. For example, drying of a coated substrate is accelerated which results in reducing or eliminating "spotting." Nanoparticles of surface treated aluminum oxide further increase hydrophobicity and increase scratch resistance. The hydrophobic properties are also facilitated by the dendritic backbone resin structure and the encapsulated zinc oxide nanoparticles.

Conventional polyurethane automotive coatings are synthesized using an acrylic polyol with a hydroxyl functionality of from 2-6 hydroxyl groups. The polyol is cured with a polyisocyanate having an isocyanate functionality likewise from 2-6. A dibutyltin catalyst is generally used to speed the cure time. In addition, other additives are typically added including surface leveling agents, flow additives, pigments for coloring, and various solvents to facilitate flow, leveling, and cure time.

In a presently preferred embodiment of this invention, the dendritic polymer is a dendritic polyester having a hydroxyl functionality of from about 40 to about 80. The molecular weight of the dendritic polyester can be from about 5,000 10,000. In particular, BOLTORN H-40®, which is a highly-branched polyester having a hydroxyl functionality of 64, is presently preferred. The hydroxyl-functional dendritic polyester can be cross linked using a polyisocyanate cross linking agent having an isocyanate functionality of from 2 to 6. A presently preferred polyisocyanate is DESMODUR N-3300®. A dibutyltin catalyst can be used to speed the cure time.

An alternative to the presently preferred polyisocyanate cross-linker is a melamine formaldehyde resin cross-linking agent such as, for example without limitation, CYMEL 303® or RESIMENE 747®. Melamine formaldehyde resin cross-linking usually requires strong acid catalysis. Presently preferred acid catalysts for use in the preparation of coatings of this invention are organic acids, in particular organic sulfonic acids such as, again without limitation, p-toluene sulfonic acid or dodecylbenzyl sulfonic acid.

To form the first component of the two component system of this invention, the dendritic polyester can be dissolved in a suitable solvent such as, without limitation, acetone, methyl ethyl ketone, methyl n amyl ketone and ethylene or propylene glycol n propyl ether acetate.

In some embodiments of the current invention, the final resin composition can also include, in addition to the dendritic polyester, an acrylic polyol having a hydroxyl functionality of from 2 to 6. Addition of the acrylic polyol tends to reduce the hardness and brittleness of the coating composition.

In presently preferred embodiments, the coating composition can also include metallic nanoparticles dispersed in the cross linked coating composition. Representative examples of such nanoparticles include, without limitation, aluminum oxide ($Al_2O_3$) and/or zinc oxide (ZnO) nanoparticles. Aluminum oxide nanoparticles can have a particle size in the range of about 10 to about 500 nanometers, preferably at present from about 20 to about 60 nm. Presently preferred aluminum oxide nanoparticles are commercially available NANOBYK 3610® aluminum oxide nanoparticles. Similarly, the zinc oxide nanoparticles can have a particle size in the range of about 10 to about 500 nm but preferably at present from about 50 to about 70 nm. Presently preferred zinc oxide nanoparticles are likewise commercially available as NANOBYK 3840® zinc oxide nanoparticles. The Al and Zn nanoparticles impart desirable properties to the coating composition that are described elsewhere herein. In an embodiment of this invention, the nanoparticles can be dispersed in a solvent to form a suspension. The nanoparticle suspension can then be combined with a solution containing the other precursor components described above. The suspension including the precursor composition components and the nanoparticles can then be combined with the cross-linking agent to ultimately result, after curing, in a highly cross-linked polyurethane coating containing dispersed nanoparticles.

In a presently particularly preferred embodiment of the invention, the aluminum and zinc nanoparticles are encapsulated in a polymer. The polymer preferably exhibits high adhesion to the nanoparticle. Additionally, the polymer can have functional groups that are capable of cross-linking with the selected cross-linker. For example, if the selected cross-linker is a polyisocyanate or a melamine formaldehyde, the encapsulating polymer can be a hydroxyl functional polymer. The encapsulating polymer is then capable of participating in the cross-linking reaction, thereby anchoring the nanoparticles to the dendrimer in the final cross-linked coating resin composition. Preferred at present is a hydroxyl functional silicone polyacrylate such as, without limitation, BYK SIL-CLEAN 3700®. The encapsulated aluminum oxide and/or zinc oxide nanoparticles increase scratch resistance, improve hydrophobicity and enhance the self-cleaning surface properties of the coating. It is presently preferred that a coating of this invention comprise both aluminum and zinc oxide nanoparticles.

Some embodiments of this invention also contain a hydroxyl functional fluorocarbon, in particular at present a hydroxyl functional fluorinated methacrylate polymer such as, without limitation, ZONYL 8857A® fluorosurfactant (DuPont). The ZONYL 8857A® provides added oil and water repellency and greater cleanability to the final coating. As with the other hydroxyl functional additives discussed here, the hydroxyl functional fluorocarbon will participate in the cross-linking of the final resin since it, too, will react with the selected cross-linker, be it a polyisocyanate, a melamine formaldehyde resin or another suitable cross-linker. When opted for, it is presently preferred that the about 0.2-0.3% by weight of the fluorosurfactant, based on the total resin weight, be added. In some embodiments the hydroxy functional fluorocarbon polymer is included in the coating composition together with the hydroxy functional silicone polyacrylate. In other embodiments, it is used instead of the hydroxy functional silicone polyacrylate.

In some embodiments, a hindered amine light stabilizer (HALS) can be included in the coating composition. HALS are well-known to those skilled in the art as efficient stabilizers against light-induced degradation of polymers. A presently preferred HALS is TINUVIN 292®.

In some embodiments, a UV absorber can be included in the composition, an example, without limitation, of which is hydroxyphenylbenzotriazole, commercially available as TINUVIN 1130®.

Each of the above additional components is, preferably a present, included in the first component of the precursor composition prior to its being combined with second component which contains the cross-linker. If one or more of the additional components is known or shown to not react with the selected cross-linker, it may, of course, be included in the second component of the two component system.

The dendritic polyester increases scratch resistance, weather resistance, chemical resistance, hydrophobicity, surface hardness, and UV resistance of the cross-linked coating. A dendritic polymer has a highly branched tree-like structure the outermost branches of which can comprise a large number of a reactive functional group such as, in the present instance, multiple hydroxyl groups. These hydroxyl groups, along with those of the acrylic polyol, if included in the composition, the fluorosurfactant, if included in the composition, and the hydroxy functional polymer-coated Al and Zn nanoparticles can all react with the polyisocyanate cross-linker to create a three-dimensional resin structure. The resulting dendrimer-containing resin structure produces a much more scratch resistant and weather resistant coating than conventional polyurethane automotive coatings synthesized from acrylic diols or triols and a diisocyanate or polyisocyanate cross-linker.

While the basic composition of this invention is clear and can be used to protect without otherwise affecting the appearance of a surface, in some embodiments of this invention, various paint pigments may be added to the resin composition to create a colored masking, matting look, or glow in the dark effects.

An exemplary cross-linked dendritic polyurethane clear coating of the present invention can be formed from the reaction mixture shown below. The designations "Side A" and "Side B" refer the separate components of the coating composition herein, which in use would be contained in separate compartments and mixed just prior to use.

a) High solids (40-60 wt %) hydroxyl functional polyester dendrimer having a hydroxyl functionality of from about 40 to about 80 (used in side A). The dendritic polyester can act as a binder for the nanoparticles if they are not coated with the hydroxy functional silicone polyacrylate and/or the fluorosurfactant. The dendritic polyester can be dissolved in acetone or other suitable solvent, which reduces its viscosity. Acetone is a VOC exempt solvent. Acetone is a colorless solvent with a high evaporation rate of 3.8 compared with n Butyl acetate of 1.

b) High solids (40-60 wt %) hydroxyl functional acrylic polyol with a hydroxyl functionality of 2 to about 6. (Used in side A).

c) Encapsulated aluminum oxide nanoparticle dispersion or suspension in a suitable solvent (e.g., without limitation, propylene glycol methyl ether acetate) with an average particle size of about 20 to about 40 nanometers. The aluminum oxide nanoparticles are encapsulated in a hydroxyl functional silicone polyacrylate having a hydroxyl functionality of from 2 to about 4 and/or a fluorosurfactant. (Used in side A)

d) Encapsulated zinc oxide nanoparticle dispersion or suspension in a suitable solvent (e.g., without limitation, propylene glycol methyl ether acetate) with an average particle size of about 50 to about 70 nm (used in side A). Zinc oxide nanoparticles are also encapsulated in the above referenced hydroxyl functional silicone polyacrylate with a hydroxyl functionality of 2 to about 4 and/or the above referenced fluorosurfactant.

e) Dibutyltin diacetate polyurethane catalyst (used in side A).

f) Sterically hindered amine light stabilizer (used in side A).

g) Hydroxyphenylbenzotriazole UV absorber (used in side A).

h) High solids (40-60 wt %) polyisocyanate crosslinker with an isocyanate functionality of 2 to about 6 (used in side B). Conventional polyisocyanates have an isocyanate (NCO) content of 15-20%. Embodiments of the present invention include using polyisocyanates with greater than 20% NCO content.

The cross-linkable composition precursors (dendritic polyester, acrylic polyol, hydroxyl functional fluorosurfactant, hydroxy functional silicone polyacrylate and polyisocyanate) are combined using processing techniques such as those described below. The composition resulting from the combined precursors is a low viscosity solution (or dispersion, if nanoparticles are present) prior to being cross-linking. The coating after cross-linking is a high cross-link density clear coating.

The overall function and properties of a coating of this invention depend on the following factors: type of binders used, binder concentration and solids level, degree and type of branching, degree of cross linking, functionality/reactivity, NCO content, NCO/OH ratio, hydroxyl content, catalyst type and concentration, choice and quality of solvents, types of additives within coating, the content of the reactive groups and the physical state of the raw materials.

In general, the higher the hydroxyl content of the particular reactant, the harder and more chemical resistant the coating composition will be. To the contrary, the lower the hydroxyl content, the softer and more flexible will be the resulting cross-linked coating composition. Generally, the higher the degree of branching, the higher the cross-linking density which results in higher chemical resistance, scratch resistance, and weather resistance. Also in general, the higher the NCO content of the polyisocyanate cross-linking agent, the harder and more chemical resistant the coating composition will be. The exemplary embodiments described herein use a high NCO content which produces a high scratch resistant coating with a high degree of flexibility and weather resistance.

The presently preferred hydroxyl functional dendritic polyester is prepared from polyhydroxy-functional esters such as, without limitation 2,2-dimethylolpropionic acid. The domain sizes of the dendritic polyester particles range from about 1 to about 20 nm. It has been observed from scanning electron microscopy (SEM), small-angle neutron scattering (SANS) and small-angle X ray scattering (SAXS) studies that there is a uniform three-dimensional distribution of these domains throughout the bulk of the resin networks. The cross-linked coating composition synthesized from the dendritic functional polyester adheres on a variety of substrates including painted metal, painted plastic surfaces, glass, some bare plastics, fiberglass, and other materials.

The term "dendrimer" refers to a polymer having a tree-like branching structure. To maximize cross-linking and optimize performance of the cross-linked coating, stoichiometric proportions of hydroxyl functional dendritic polyester, acrylic polyol, polyisocyanate and hydroxy functional silicone polyacrylate resin may be reacted. The selected reaction ratio can be calculated from the equivalent weight of the dendritic polyester, acrylic polyol and hydroxy functional silicone polyacrylate that are proportionate to the equivalent weight of the polyisocyanate resin used. Dendritic polymers are characterized by a highly branched structure that allows for a larger number of reactive groups than a less branched or unbranched polymer. Dendritic polymers tend to have a globular structure which results in excellent flow properties that facilitate processing even at high molecular weight. The high concentration of reactive groups facilitates customization of properties for a wide range of end uses. Dendritic polyesters have a high degree of molecular uniformity, relatively narrow molecular weight distribution, specific size and shape characteristics, and a highly-functionalized terminal surface or end-groups.

The synthesis of dendritic polymers includes a series of repetitive steps starting with a central initiator core. Each subsequent growth step represents a new "generation" of polymer with a larger molecular diameter, twice the number of reactive surface sites, and approximately double the molecular weight of the preceding generation. The exemplary dendritic polymer used in embodiments of the present invention is a fourth generation dendrimer having a hydroxyl functionality of 40 80. The densely branched aliphatic structure and high functionality of dendritic polyesters allow for synthesis using solvents having low volatile organic content (VOC) and allows for rapid drying of the reaction mixture. The densely branched aliphatic structure and high functionality of dendritic polyesters also allow synthesis of a cross-linked composition having superior scratch resistance, excellent flexibility, water repellency, and superior chemical resistance.

In the preparation of a coating of this invention, the hydroxyl functional dendritic polyester is used as a cross-linked building block and as an elastomer cross-linker. Using hydroxy functional dendritic polyester cross-linked with polyisocyanates to produce the highly cross-linked polyurethanes of this invention tends to increase the glass transition temperature, Tg, of the resulting resin. Typically, the higher the glass transition temperature, the harder the coating surface as measured by such methods as the Shore-hardness test.

To maximize cross-linking and optimize performance of the cross-linked coating, stoichiometric proportions of acrylic polyol, the hydroxy functional dendritic polyester, the hydroxy functional silicone polyacrylate and/or the fluoro-surfactant may be reacted with the polyisocyanate. The reaction ratio can be calculated from the equivalent weight of the hydroxy functional dendritic polyester, acrylic polyol and the hydroxy functional silicone polyacrylate and the equivalent weight of the polyisocyanate. Acrylic resins are conventionally used for high solids clear coats over paints, metals, wood, and plastics.

Catalysts such as dibutyltin diacetate are typically used in two-component polyurethane coatings to shorten the curing time, especially in those containing aliphatic polyisocyanates. Various other compounds such as dibutyltin dilaurate, zinc octoate and triethylenediamine can also be used as suitable catalyst alternatives for both two-component coatings and one-component moisture-curing types.

Nanoparticles can improve the properties of coating in several ways. It is well-known, for example, that hard particles such as alumina and silica improve scratch and abrasion resistance when included in a coating. However, the use of large particles, several microns in diameter, can lead to undesirable results, for example, gloss and transparency of clear coatings can be reduced and the flexibility or toughness of the coating may be substantially reduced.

Nanoparticles, on the other hand, generally do not have these negative effects and therefore have advantages over micron-size particles. A nanoparticle can refer to a particle having a dimension between about 1 nm to about 500 nm. Certain nanoparticles, such as alumina and zinc, improve scratch resistance, but tend to have a little no effects on other coating properties. Specifically, gloss, transparency, and flexibility of a coating can be unchanged or substantially unaffected by the nanoparticles.

The improvement of coating properties arising from nanoparticles is facilitated by uniform or substantially uniform dispersion and stabilization of the nanoparticles in the coating. Nanoparticles can be obtained commercially as a well-dispersed dispersion in a liquid organic carrier. The nanodispersion can be added to the coating reaction mixture with moderate shear forces using methods known to those of skill in the art.

The dendritic polyurethane clear coating described herein utilizes aluminum and zinc metal oxide nanoparticles. In some embodiments, the particles have no or substantially no agglomeration. These metal oxide nanoparticles can be fabricated using a Physical Vapor Synthesis (PVS) Process. In this process, arc energy is applied to a solid precursor (typically metal) in order to generate a vapor at high temperature. A reactant gas is then added to the vapor, which is then cooled at a controlled rate and condenses to form nanoparticles. The nanomaterials produced by the PVS process include discrete, nonporous or substantially nonporous particles of defined crystallinity. This method typically produces particles with average sizes ranging from 8 75 nm.

The incorporation of either or both aluminum oxide and zinc oxide nanoparticles within the cross-linked polyurethane coating tends to improve scratch resistance and hardness of the coating composition. The aluminum oxide nanoparticles can have a uniform or substantially uniform particle size distribution of about 1 to about 500 nm, preferably at present about 20 to about 40 nm. The zinc oxide nanoparticles can have a uniform or substantially uniform particle size distribution of about 1 to about 500 nm, preferably at present about 50 to about 70 nm. The nanoparticles can improve scratch resistance due to reinforcement of the cross-linked composition. The nanoparticles can be incorporated throughout the polymer network by including a liquid dispersion of nanoparticles within the reaction mixture. The aluminum oxide or zinc oxide nanoparticles can be used as a dispersion in, for example without limitation, propylene glycol methyl ether acetate. Propylene glycol methyl ether acetate is a colorless solvent with an evaporation rate of 0.30 compared with n-Butyl Acetate of 1. Propylene glycol methyl ether acetate has excellent solvency characteristics for the reactive components described.

In some embodiments, the nanoparticles can be surface treated or encapsulated within a hydroxy functional silicone polyacrylate resin and/or a fluorinated methacrylate polymer (surfactant). The hydroxyl functional silicone polyacrylate can cross-link into the resin network of the coating composition. The cross-linking of the encapsulation polymer can act to increase the scratch resistance and increase hydrophobicity of the surface of the coating composition. In addition, the incorporated nanoparticles produce or enhance the self-cleaning action of the coating composition. The increase in coating scratch resistance due to the nanoparticles tends to be dramatically enhanced when nanoparticles are encapsulated in the silicone polyacrylate and/or fluorinated methacrylate polymer (surfactant). The silicone polyacrylate and/or the hydroxyl functional fluorinated methyacrylate fluorosurfactant tends to improve the overall performance of the nanoparticles considerably including improving scratch and abrasion resistance, long-term hydrophobicity, and slip and mar resistance. The nanoparticles can provide long-term scratch, mar and/or abrasion resistance without significantly affecting optical clarity, gloss, color, or other physical coating properties. These particles have a low aspect ratio, high surface, and chemical purity and a controlled surface chemistry. The nanoparticles can be encapsulated with silanes, silicones or fluorosurfactants to improve dispersability. It has been experimentally observed that surface treating nanoparticles with hydroxyl-functional silicone polyacrylate or hydroxy functional fluorinated methacrylate polymer (surfactant) can dramatically enhance the performance of the surface coating.

The incorporation of the zinc oxide nanoparticles within the coating composition tends to reduce or prevent UV degradation of the coated substrate and reduces or prevents dirt from adhering to the coating surface. These effects are due a photocatalytic process in which the electrons in the zinc oxide nanoparticles become excited from UV light exposure. This photocatalytic process reduces or prevents yellowing of the substrate. The zinc oxide dispersion is diluted with propylene glycol methyl ether acetate.

As discussed above, a hydroxy functional silicone polyacrylate and/or hydroxy functional fluorinated methacrylate polymer (surfactant) can be used to surface treat the aluminum oxide and zinc oxide nanoparticles to produce a hydrophobic, anti-graffiti, and self-cleaning dirt release effect throughout the cross-linked polymer network. The hydroxy functional silicone polyacrylate resin or hydroxyl functional fluorinated methacrylate polymer (surfactant) cross-links with the other reactive components as described to produce a permanent coating with hydrophobic and dirt release properties.

EXAMPLES

The following examples are provided solely to aid in understanding the invention and are not intended, nor may they be construed, to limit the scope of this invention in any manner whatsoever.

Example 1

Example 1 is illustrates the preparation of two-component dendritic polyurethane clear coating. Part A refers to the resin component and Part B refers to the cross-linker component or, as it is sometimes interchangeably referred to in this description, "activator" component. Part A and Part B are mixed 1:1 by volume.

Step 1: Part (A)

A 200 ml round bottom enclosed flask is charged with 4-6 grams BOLTORN H40® hydroxyl functional dendritic polyester (Perstorp Specialty Chemicals, Perstorp, Sweden) and 12 grams anhydrous acetone. The material is stirred for 5 10 minutes.

Step 2: Part (A)

A separate 100 ml round bottom flask is charged with 20 30 grams G CURE 108BL70® (Cognis Polymers, Cincinnati, Ohio). This flask will be used as the base mixing container to develop part (A) resin.

Step 3: Part (A)

Using the 100 ml round bottom flask described in Step 2, 15 20 grams of the dendritic polyester solution described in Step 1 are added and the mixture is stirred for 40-60 seconds until the dendritic polyester solution is fully dispersed.

Step 4: Part (A)

Using the 100 ml round bottom flask described in Step 3, 0.25-0.30 grams of dibutyltin diacetate (DBTA, OMG Group, Cleveland, Ohio) is added and the mixture is stirred for 40-60 seconds until the catalyst is in solution.

Step 5: Part (A)

A separate 50 ml round bottom flask is charged with 3.5-5.5 grams NANOBYK 3610® aluminum oxide nanodispersion (BYK Chemie, Wesel, Germany). The flask is then charged with 0.5-0.8 grams NANOBYK3840® zinc oxide nanodispersion (BYK Chemie, Wesel, Germany). Then 0.25-0.7 gram BYK SILCLEAN 3700® (BYK Chemie, Wesel, Germany) is added and the mixture stirred for 40-60 seconds until fully dispersed. The hydroxy functional silicone polyacrylate resin, which has a high affinity for the nanoparticles, attaches to and encapsulates the nanoparticles to create a nanoparticle core structure with a silicone polyacrylate shell.

Step 6: Part (A)

Using the 100 ml round bottom flask described in Step 4, 4-6 grams of the nanoparticle dispersion solution described in Step 5 is added and stirred for 40-60 seconds until the hydroxy functional silicone polyacrylate surface treated nanoparticle dispersion is well dispersed throughout the combined mixture.

Step 7: Part (A)

The 100 ml round bottom flask described in Step 6 is then charged with 0.3-0.5 grams sterically hindered amine light stabilizer (TINUVIN 292®, Ciba Specialty Chemicals, Tarrytown, N.Y.), then 0.8 1.3 grams hydroxyphenyl-benzotriazole UV absorber (TINUVIN 1130®, Ciba Specialty Chemicals, Tarrytown, N.Y.) are added. The mixture is stirred for 40-60 seconds until the materials are fully dispersed. Part A resin binder solution is complete. Step 7 is ready to be added at a 1:1 ratio by volume with the completed solution of Part B activator solution.

Step 8: Part (B)

A separate 100 ml round bottom flask is charged with 8-15 grams of DESMODUR N-3300® (Bayer Material Sciences, Leverkusen, Germany. DESMODUR N-100® may also be used).

Step 9: Part (B)

The 100 ml round bottom flask described in Step 8 is charged with 15-22 grams methyl ethyl ketone or acetone to reduce viscosity. The mixture is then stirred for 40-60 seconds.

Step 10: Part (B)

The 100 ml round bottom flask described in Step 9 is then charged with an additional 3-5 grams of propylene glycol methyl ether acetate with a 0.30 evaporation rate to reduce viscosity and slow the evaporation rate of the coating composition. The mixture is then stirred for 40-60 seconds until the propylene glycol methyl ether acetate is fully dispersed.

Step 11

Using the 100 ml round bottom flask described in Step 7, the entire contents (27-32 grams) of material described in step 10 are blended with 46-50 grams of material described in Step 7 and stirred for 40-60 seconds until the combined mixture is fully dispersed. Step 11 contains all of the raw materials for the final coating composition.

The following example is application information for coating based on dendritic polyurethane nanocomposite. ZYVERE® is a registered trademark corresponding to an embodiment of the coating.

A. General Instructions

Activator (Cross-linker) is moisture sensitive. Keep container closed to avoid moisture contamination. Surface should be completely dry and without moisture. ZYVERE® can be applied over conventional basecoat paints:

1. ZYVERE® Clear Nanocoating performance is proportionate to the degree of surface preparation. Surface must be very clean and super dry before coating. Remove dirt, grease, loose particles and wax with a suitable non-water cleaning agent or urethane grade solvent.

2. Surface panel should be sanded with P800 grit or finer sand paper on a random orbital sander or scuff sanded with a gray scotch-brite pad before coating.

3. Repeat step one and then thoroughly dry surface to be panted with a clean tack cloth.

4. Suitable Substrates (Must be sanded and cleaned before coating): OEM enamels, Urethane Base Coat, Single Stage Urethane, Acrylic Enamel, Acrylic Lacquer, Polycarbonate, Fiberglass, glass, ceramic and most painted plastics.

B. Directions for Application of Two Component System:

1. To ensure proper adhesion, surface should be lightly wet sanded with 1500-2000 grit paper or 000 steel wool.

2. Surface must be very clean and dry before coating. Remove dirt, grease, loose particles and any foreign materials including wax with a suitable solvent.

3. Use in a ventilated spray booth when temperature is between 72° F. and 80° F. (19° and 27° C.) and humidity is between 50 65% to ensure proper curing.

4. Mix equal volume parts of ZYVERE® Resin (Part A) with ZYVERE® Activator (Part B) with a 1:1 Ratio by Volume, for example, 100 ml Part Resin+100 ml Part Activator.

5. Apply ZYVERE® mixture using a Professional HVLP/LVLP Paint Sprayer. Fluid Tip: 1.3-1.4 mm or equivalent. Air pressure: 8 10 PSI at the cap for HVLP/LVLP guns.

6. Apply one continuous medium coat, then 1 full coat (2 coats) at a gun distance of 5-7 inches. Allow 5-10 minutes between coats and wait 5 10 minutes before baking to allow for leveling and solvent evaporation.

7. Pot life of mixed components is 60 min.

8. Baking Recommended @150-170° F. (Metal Temp) for 30 minutes+2 hour cool down.

9. Air Dry Cure @72° F.: Dust free in 30 min. Handle in 4 hours. Buffing in 48 hours @72° F. (Test surface hardness before buffing).

10. Clean up: Acetone, MEK, Dowanol PMA or MIBK can be used to clean overspread and sprayer clean up C. Application Parameters 1. Gun Pressure: Use 8 10 PSI at the cap for HVLP/LVLP. Adjust air pressure at the gun to 50 55 PSI for conventional.

2. Fluid Tip: 1.3-1.4 mm or equivalent

3. Flash Time: 5-10 minutes between coats

4. Mixing: 1:1 Ratio by Volume

5. Film Build: 1.4-1.8 mils per coat
6. Final Dry Film Thickness: 2-3 mils
7. Heat Cure Recommended:
   a. To Buff: 30 minutes @150-170° F. (Metal Temperature)+2 hours at room temperature
   b. Infrared: Medium Wave 15 minutes. Short Wave 8 minutes
8. Air Cure Time: Pot life is 60 minutes @72° F.
   a. Dust-free: 30 minutes @72° F.
   b. Dry-to-touch: 2 hours @72° F.
   c. Tape Time: 5 6 hours @72° F.
   d. Infrared: Medium Wave 15 minutes. Short Wave 8 minutes.
   e. Buffing: 48 hours @72° F.
9. Application Information: Apply 1 continuous medium coat, then 1 full coat (2 coats) at a gun distance of 5-7 inches. Allow solvent evaporation and leveling between coats. Apply coats within 5-10 minutes of the first to prevent a possible recast lift. Allow 10 minutes before baking.
10. IMPORTANT: Clean spray gun immediately after use with lacquer thinner or cleaning solvent. Avoid the use of mineral spirits.
11. To ensure proper atomization, it is critical to check air can measure with manufactures kit.

C. Curing Schedule:

Cure times are based on the recommended dry film thickness of 1.0-1.5 mils for basecoat color and 2.0-3.0 mils for Zyvere clear nanocoating.

D. Buffing Instructions:

1. Heat Cure (presently preferred): Allow ZYVERE® to cure for 30 minutes @150-170° F. (Metal Temperature)+2 hours at room temperature before sanding or buffing.

2. Air Cure: Allow ZYVERE® to cure 48 hours under normal ambient conditions before sanding or buffing.

3. If necessary, sand with 1500 to 2000 grit sandpaper.

4. Buff by machine with polishing pad using a quality micro finishing compound, follow with a micro finishing glaze.

Example 3

ZYVERE® coatings were tested at Eastern Michigan University by Stonebridge Technical Services. The results, which are summarized in Table 1, demonstrate that the coating described herein provides far superior performance compared to the closest automotive OEM aftermarket polyurethane clear coatings including PPG's CERAMICLEAR®, which uses nanoparticles in the formulation (US Published Patent Application Nos. 2003/0162876 and 2003/0162015).

The coating compositions described herein are characterized by low viscosity to facilitate spraying and to facilitate a chemical adhesion to a variety of substrates including painted metal, aluminum, painted plastic, some plastics, fiberglass, wood, epoxy, acrylic and most polyurethane based paints and powder coatings. The coating compositions are characterized by a coating viscosity measured using a No. 2 (#2) Zahn Cup from 15 18 seconds measured at room temperature (approximately 18.degree. C.).

TABLE 1

| | Sample | | |
|---|---|---|---|
| | A | B | C |
| Clearcoat | Zyvere | CeramiClear | SB Acrylic Silane Melamine OEM |
| Manufacturer | Nanovere | PPG | DuPont |
| Cure Schedule | 30° @ 150° F. | 30° @ 150° F. | OEM |
| Clearcoat DFT (mils) | 1.8-2.0 | 1.8-2.0 | 2.1-2.0 |
| Gloss per ASTM D523 (20°/60°) | 86.0/92.2 | 85.8/92.0 | 88.1/94.1 |
| Adhesion per ASTM D3359 Method B to White (A1 & B1) | 5B/100% | 5B/100% | 5B/100% |
| Adhesion per ASTM D3359 Method B to Silver (A2 & B2) | 0B/0% | 0B/0% | — |
| Pencil Hardness - Scratch per ASTM D3363 | 5H | F | 4H |
| Pencil Hardness - Gouge per ASTM D3363 | 4B | 3B | 2B |
| Pencil Hardness - Gouge per ASTM D3363 After 24 Hr. Recovery | 3B | 3B | 2B |
| Taber Abrasion per ASTM D4060 (mg lost per 1,000 cycles) | 19.85 | 36.20 | 52.20 |
| Impact Resistance per ASTM D2794 - Initial | | | |
| Direct (inch-pounds) | 150 Fail/140 Pass | 90 Fail/80 Pass | 50 Fail/40 Pass |
| Reverse (inch-pounds) | 160 Pass | 120 Fail/100 Pass | 10 Fail/5 Pass |
| Impact Resistance per ASTM D2794 - After 48 Hrs. @ 250° F. (in/lbs) | | | |
| Direct (inch-pounds) | 70 Fail/60 Pass | 60 Fail/50 Pass | 20 Fail/10 Pass |
| Reverse (inch-pounds) | 5 Fail | 5 Fail | 5 Fail |
| Flexibility per ASTM D522 | Pass ¼"/Fail ⅛" ** | n/a | Fail ¾"/Pass 1" ** |
| Chemical Spot Resistance per ASTM D1308 | | | |
| 10% Sulfuric Acid | No Effect | No Effect | No Effect |
| 10% Hydrochloric Acid | No Effect | No Effect | No Effect |
| 10% Sodium Hydroxide | No Effect | No Effect | No Effect |
| 10% Ammonium Hydroxide | No Effect | No Effect | No Effect |
| Isopropyl Alcohol | No Effect | No Effect | No Effect |
| Xylene | Slight Softening | Slight Softening | Slight Swelling |
| Xylene (24 hour recovery) | No Effect | No Effect | No Effect |
| MEK | No Effect | No Effect | No Effect |
| Gasoline (87 Octane) | No Effect | No Effect | No Effect |
| MEK Resistance per ASTM D4752 (Double Rubs) | >1,500 | 260 | >1,500 |

What is claimed:

1. A coating composition comprising:
   a first component comprising:
      a hydroxyl functional dendritic polymer;

a plurality of metal oxide nanoparticles encapsulated in a hydroxyl functional polymer and/or a hydroxyl functional fluorosurfactant;
a catalyst; and
a first solvent in which the above materials are dissolved or, in the case of the nanoparticles, dispersed; and
a second component comprising:
a cross-linking agent, and
a second solvent which may be the same as or different from the first solvent; wherein:
the first and second components are mixed together to form the coating composition.

2. The coating composition of claim 1, wherein the hydroxyl functional dendritic polymer has a hydroxyl functionality of 40 to 80.

3. The coating composition of claim 2, wherein the hydroxyl functional dendritic polymer is a highly-branched polyester having a hydroxyl functionality of 64.

4. The coating composition of claim 1, wherein the first component further comprises an acrylic polyol.

5. The coating composition of claim 4, wherein the acrylic polyol has a hydroxyl functionality of 2 to 6.

6. The coating composition of claim 1, wherein the hydroxyl functional fluorosurfactant is a hydroxyl functional fluorinated methacrylate polymer.

7. The coating composition of claim 1, wherein the plurality of encapsulated metal oxide nanoparticles is selected from the group consisting of encapsulated aluminum oxide nanoparticles, encapsulated zinc oxide nanoparticles and combinations thereof.

8. The coating composition of claim 7, wherein the encapsulated aluminum oxide nanoparticles are provided in a dispersion or suspension.

9. The composition of claim 7, wherein the encapsulated zinc oxide nanoparticles are provided in a dispersion or suspension.

10. The coating composition of claim 1, wherein the plurality of encapsulated metal oxide nanoparticles comprises a mixture of encapsulated aluminum oxide nanoparticles and encapsulated zinc oxide nanoparticles, provided in a dispersion or suspension.

11. The coating composition of claim 1, wherein the hydroxyl functional polymer is a hydroxyl functional silicone acrylate.

12. The coating composition of claim 11, wherein the hydroxyl functional silicone acrylate is a hydroxyl functional silicone polyacrylate.

13. The coating composition of claim 1, wherein the first component further comprises a sterically hindered amine light stabilizer.

14. The coating composition of claim 1, wherein the first component further comprises a UV absorber.

15. The coating composition of claim 14, wherein the UV absorber is a hydroxyphenylbenzotriazole UV absorber.

16. The coating composition of claim 1, wherein the first solvent is anhydrous acetone and propylene glycol methyl ether acetate.

17. The coating composition of claim 1, wherein the cross-linking agent is a polyisocyanate.

18. The coating composition of claim 17, wherein the polyisocyanate has an isocyanate functionality of from 2 to 6.

19. The coating of claim 18, wherein the catalyst is dibutyltin diacetate.

20. The coating of claim 1, wherein the cross-linking agent is a melamine formaldehyde resin.

21. The coating composition of claim 20, wherein the melamine formaldehyde resin is hexa(methoxymethyl) melamine.

22. The coating composition of claim 1, where the second solvent is a mixture of acetone and propylene glycol methyl ether acetate or a mixture of methyl ethyl ketone and propylene glycol methyl ether acetate.

23. The coating composition of claim 1, wherein the first component comprises:
a hydroxyl functional dendritic polymer, wherein the hydroxyl functional dendritic polymer is a highly-branched polyester having a hydroxyl functionality of 64;
an acrylic polyol;
aluminum oxide nanoparticles encapsulated in a hydroxyl functional silicone polyacrylate, provided in a dispersion or suspension;
zinc oxide nanoparticles encapsulated in a hydroxyl functional silicone polyacrylate, provided in a dispersion or suspension;
a sterically hindered amine light stabilizer;
a hydroxyphenylbenzotriazole UV absorber;
a dibutyltin diacetate catalyst; and
a mixture of anhydrous acetone and propylene glycol methyl ether acetate; and the second component comprises:
a polyisocyanate cross-linking agent having an isocyanate functionality from 2 to 6; and
a mixture of acetone or methyl ethyl ketone and propylene glycol methyl ether acetate; wherein:
the first and second components are mixed together to form the coating composition.

24. The coating composition of claim 23, further comprising a hydroxyl functional fluorinated methacrylate polymer fluorosurfactant.

25. The coating composition of claim 1 wherein the first component comprises:
a hydroxyl functional dendritic polymer, wherein the hydroxyl functional dendritic polymer is a highly-branched polyester having a hydroxyl functionality of 64;
an acrylic polyol, wherein the acrylic polyol has a hydroxyl functionality of 2 to 6;
aluminum oxide nanoparticles encapsulated in a hydroxyl functional silicone polyacrylate, provided in a dispersion or suspension;
zinc oxide nanoparticles encapsulated in a hydroxyl functional silicone polyacrylate, provided in a dispersion or suspension;
a sterically hindered amine light stabilizer;
a hydroxyphenylbenzotriazole UV absorber;
an acid catalyst; and
a mixture of anhydrous acetone and propylene glycol methyl ether acetate; and the second component comprises:
a hexa(methoxymethyl)melamine formaldehyde resin; and
a mixture of acetone or methyl ethyl ketone and propylene glycol methyl ether acetate; wherein:
the first and second components are mixed together to form the coating composition.

26. The coating composition of claim 25, wherein the acid catalyst is a sulfonic acid.

27. The coating composition of claim 26, wherein the sulfonic acid is selected from the group consisting of p-toluene sulfonic acid and dodecylbenzyl sulfonic acid.

28. The coating composition of claim 25, further comprising a hydroxyl functional fluorinated methacrylate polymer fluorosurfactant.

29. The coating composition of claim 1, wherein the first component comprises:
- a hydroxyl functional dendritic polymer, wherein the hydroxyl functional dendritic polymer is a highly-branched polyester having a hydroxyl functionality of 64;
- an acrylic polyol, wherein the acrylic polyol has a hydroxyl functionality of 2 to 6;
- aluminum oxide nanoparticles encapsulated in a hydroxyl functional fluorinated methacrylate polymer, provided in a dispersion or suspension;
- zinc oxide nanoparticles encapsulated in a hydroxyl functional fluorinated methacrylate polymer, provided in a dispersion or suspension;
- a sterically hindered amine light stabilizer;
- a hydroxyphenylbenzotriazole UV absorber;
- a dibutyltin diacetate catalyst; and
- a mixture of anhydrous acetone and propylene glycol methyl ether acetate; and the second component comprises:
- a polyisocyanate crosslinking agent having an isocyanate functionality from 2 to 6; and
- a mixture of acetone or methyl ethyl ketone and propylene glycol methyl ether acetate; wherein:
- the first and second components are mixed together to form the coating composition.

30. A surface protective coating, comprising the coating composition of claim 1 after it has been deposited on a substrate surface, cured and dried.

31. A method of forming a surface protective coating on a substrate surface, comprising:
- providing a coating composition of claim 1;
- depositing the coating composition on the substrate surface no more than about one hour after mixing the first and second components; and
- curing the deposited coating composition.

32. The method of claim 31, wherein curing comprises heating the deposited coating composition.

* * * * *